US010922358B2

(12) United States Patent
Garg et al.

(10) Patent No.: US 10,922,358 B2
(45) Date of Patent: Feb. 16, 2021

(54) SYSTEM AND METHOD FOR ANALYSIS OF STRUCTURED AND UNSTRUCTURED DATA (71) Applicant: KPMG LLP, New York, NY (US)

(72) Inventors: Manish U. Garg, Jersey City, NJ (US); Kallol K. Ghosh, Alpharetta, GA (US); Elliott A. Torres, Wilmette, IL (US); Nikhil S. Dharap, Chicago, IL (US); Steve Rainey, Vienna, VA (US); Timothy J. Cerino, Hastings on Hudson, NY (US); John Hyung Lee, Irvine, CA (US); Nader Karimi, New York, NY (US)

(73) Assignee: KPMG LLP, New York, NY (US)

( * ) Notice: Subject to any disclaimer, the term of this patent is extended or adjusted under 35 U.S.C. 154(b) by 111 days.

(21) Appl. No.: 16/159,105

(22) Filed: Oct. 12, 2018

(65) Prior Publication Data
US 2019/0114360 A1 Apr. 18, 2019

Related U.S. Application Data (60) Provisional application No. 62/572,266, filed on Oct. 13, 2017.

(51) Int. Cl.
G06F 16/9032 (2019.01)
G06F 40/14 (2020.01)
(Continued)

(52) U.S. Cl.
CPC ...... G06F 16/90332 (2019.01); G06F 16/116 (2019.01); G06F 16/1794 (2019.01);
(Continued)

(58) Field of Classification Search
CPC .... G06F 40/14; G06F 40/205; G06F 16/1794; G06F 16/285; G06F 16/35; G06F 16/90332; G06F 40/30; G06F 40/56
(Continued)

(56) References Cited

U.S. PATENT DOCUMENTS 7,139,752 B2  11/2006  Broder et al.
9,053,086 B2   6/2015  Dubbels
(Continued)

FOREIGN PATENT DOCUMENTS

WO    2009/087431    7/2009

OTHER PUBLICATIONS

International Search Report and Written Opinion issued in corresponding Application No. PCT/US18/55892, dated Dec. 26, 2018.
(Continued)

Primary Examiner — Hung T Vy
(74) Attorney, Agent, or Firm — Hunton Andrews Kurth LLP (57) ABSTRACT The invention relates to a computer-implemented system and method for analyzing unstructured data from a plurality of input files, and standardizing the data to a format that can be consumed by downstream systems. The method may comprise the steps of: receiving at least one input file to be analyzed, wherein the at least one input file includes the structured and unstructured data, splitting the at least one input file into a plurality of documents, classifying each page of the plurality of documents as one of structured or unstructured data, parsing the pages of the plurality of documents classified as unstructured data, extracting relevant data from the parsed pages, mapping each of the extracted relevant data to standardized output; and generating canonical data sets based on the standardized outputs.

20 Claims, 5 Drawing Sheets (51) Int. Cl.

| | |
|---|---|
| *G06F 40/30* | (2020.01) |
| *G06F 40/56* | (2020.01) |
| *G06F 40/131* | (2020.01) |
| *G06F 40/169* | (2020.01) |
| *G06F 40/205* | (2020.01) |
| *G06F 40/216* | (2020.01) |
| *G06F 40/295* | (2020.01) |
| *G06N 20/00* | (2019.01) |
| *G06F 16/178* | (2019.01) |
| *G06F 16/11* | (2019.01) |
| *G06F 16/28* | (2019.01) |
| *G06F 16/35* | (2019.01) |
| *G06K 9/00* | (2006.01) |

(52) U.S. Cl.
CPC ............ *G06F 16/285* (2019.01); *G06F 16/35* (2019.01); *G06F 40/131* (2020.01); *G06F 40/14* (2020.01); *G06F 40/169* (2020.01); *G06F 40/205* (2020.01); *G06F 40/216* (2020.01); *G06F 40/295* (2020.01); *G06F 40/30* (2020.01); *G06F 40/56* (2020.01); *G06K 9/00456* (2013.01); *G06N 20/00* (2019.01)

(58) Field of Classification Search
USPC ...................................... 707/737; 706/12, 45
See application file for complete search history.

(56) References Cited

U.S. PATENT DOCUMENTS

| | | |
|---|---|---|
| 9,519,706 B2 | 12/2016 | Luke |
| 2002/0143797 A1* | 10/2002 | Zhang .................... G06F 16/16 |
| 2005/0289182 A1 | 12/2005 | Pandian et al. |
| 2008/0168135 A1* | 7/2008 | Redlich ............... G06F 21/6218 709/204 |
| 2010/0036785 A1* | 2/2010 | Tzruya ............... G06Q 30/0251 706/45 |
| 2012/0011428 A1 | 1/2012 | Chisholm |
| 2014/0067792 A1 | 3/2014 | Erdogan et al. |
| 2014/0156833 A1 | 6/2014 | Robinson |
| 2014/0297356 A1 | 10/2014 | Jayade |
| 2015/0213374 A1* | 7/2015 | Agarwal ............... G06K 9/6269 706/12 |
| 2015/0277900 A1 | 10/2015 | O'Keeffe et al. |
| 2016/0179934 A1 | 6/2016 | Stubley et al. |
| 2017/0012988 A1 | 1/2017 | Turgeman et al. |
| 2017/0069043 A1* | 3/2017 | Doyle ............... G06F 16/24575 |
| 2018/0121526 A1* | 5/2018 | Wolfman ............... G06F 16/164 |

OTHER PUBLICATIONS

International Search Report and Written Opinion issued in corresponding Application No. PCT/US18/55921, dated Dec. 31, 2018.
Apache UIMA, https://uima.apache.org/, pp. 1-5, Jul. 26, 2017.
Apache UIMA Ruta™, https://web.archive.org/web/20170721192241/https://uima.apache.org/ruta.html, pp. 1-3, (Wayback Machine dated Jul. 21, 2017; printed Nov. 4, 2019).
Industrial-Strength Natural Language Processing in Python, https://spacy.io/, pp. 1-4, Jul. 26, 2017.
Operationalize enterprise information into actionable intelligence, https://www.smartlogic.com, pp. 1-5, Jul. 26, 2017.
Watson Knowledge Studio documentation—Watson Developer Cloud, Creating a rule-based annotator, https://web.archive.org/web/20161219064856/http://www.ibm.com/watson/developercloud/doc/wks/wks_rule_annotator_ovw.shtml, pp. 1-15, (Wayback Machine dated Dec. 19, 2016; printed Nov. 4, 2019) also includes 17-page addendum with text copied from Wayback Machine page).

* cited by examiner

SYSTEM AND METHOD FOR ANALYSIS OF STRUCTURED AND UNSTRUCTURED DATA

CROSS-REFERENCE TO RELATED APPLICATION

This application claims the benefit of the filing date of, and incorporates by reference thereto in its entirety, U.S. Provisional Patent Application Ser. No. 62/572,266, filed on Oct. 13, 2017.

FIELD OF THE INVENTION

The present invention relates to systems and methods for analyzing unstructured data from a plurality of input files, and standardizing the data to a format that can be consumed by downstream systems.

BACKGROUND

The digitization of labor continues to progress as advancements in machine learning, data analytics, mobile computing and cloud computing are used in various combinations to replace certain business processes and functions. Basic process automation can be implemented without significant IT investment as solutions may be designed, tested, and implemented for a relatively low cost. Enhanced process automation incorporates more advanced technologies that enable the use of data to support elements of machine learning. Machine learning tools can be used to discover naturally-occurring patterns in data and to predict outcomes. And natural language processing tools are used to analyze text in context and extract desired information.

Such digital tools generally require that the data being processed is structured, e.g., text stored in a recognized data structure, such as data organized in columns and rows for transactional system data or Microsoft Excel files. However, the current tools are not particularly useful if the data to be processed is unstructured, e.g., the text not stored in a recognized data structure, such as contracts, Tweets, policy documents, etc. For example, the current tools would not be able to extract narrative footnotes found in K-1 filings or structure that information into a standard format.

It would be desirable, therefore, to have a system and method that could overcome the foregoing disadvantages of known systems and that could apply automated and customized analysis to analyze documents, communications, text files, websites, and other structured and unstructured input files to generate output in the form of canonical datasets to feed downstream systems.

SUMMARY

According to one embodiment, a computer-implemented method for analysing at least one of structured and unstructured data may comprise: receiving at least one input file to be analyzed, wherein the at least one input file includes the structured and unstructured data, splitting the at least one input file into a plurality of documents, classifying each page of the plurality of documents as one of structured or unstructured data, parsing the pages of the plurality of documents classified as unstructured data, extracting relevant data from the parsed pages, mapping each of the extracted relevant data to standardized output, and generating canonical data sets based on the standardized outputs.

The invention also relates to systems for analysis of such structured and unstructured data.

The method and systems may provide value in a number of ways including the analysis of structured and unstructured content in a fast and efficient process, thereby providing a significant savings in time, cost, and accuracy.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

According to one embodiment, the invention relates to an automated system and method for analysis of structured and unstructured data. The analysis system (sometimes referred to herein as the "System") may include a portfolio of artificial intelligence capabilities, including artificial intelligence domain expertise and related technology components. The System may include foundational capabilities such as document ingestion and optical character recognition (OCR), e.g., the ability to take documents and convert them into formats readable by a machine to perform analytics. According to a preferred embodiment, the System also includes machine learning (ML) components that provide the ability for the System to learn without being explicitly programmed (supervised and unsupervised); deep learning components that model high level abstractions in data; and natural language processing (NLP) and generation, e.g., functionality to understand human speech or text and produce text or speech.

The System can also be designed to ingest and process various types of input data, including structured data (e.g., data organized in columns and rows such as transactional system data and Microsoft Excel files); semi-structured data (e.g., text not stored in a recognized data structure but that still contains some type of tabs or formatting, such as forms); unstructured data (e.g., text not stored in a recognized data structure, such as contracts, Tweets and policy documents); and images and voice (e.g., photographs or other visual depictions of physical objects and human voice data).

The System can be deployed to ingest, understand and analyze the documents, communications, and websites that make up the rapidly growing body of structured data and unstructured data. According to one embodiment, the System may be designed to: (a) read transcripts, tax filings, communications, financial reports, and similar documents and input files, (b) extract information and capture the information into structured files, (c) assess the information in the context of policies, rules, regulations, and/or business objectives, and (d) answer questions, produce insights, and identify patterns and anomalies in the information. The System can capture and store subject matter expertise; ingest, mine and classify documents using NLP; incorporate advanced ML and artificial intelligence methods; and utilize collaborative, iterative refinement with subject matter experts and client stakeholders.

Figure 1:
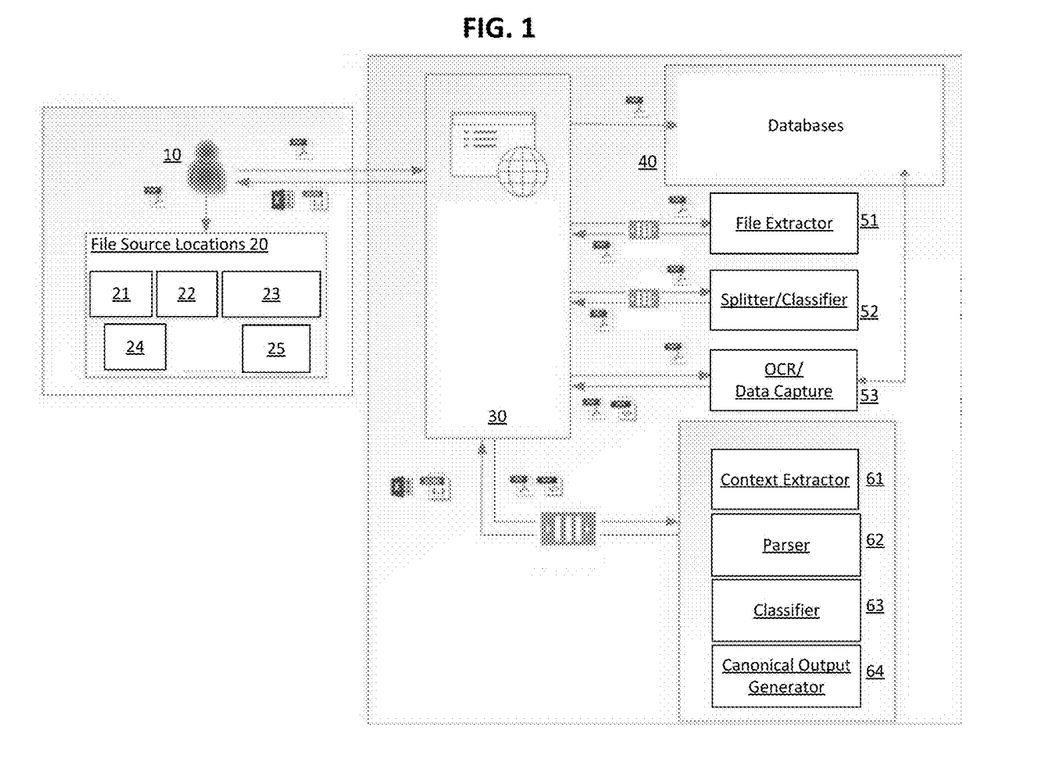
FIG. 1 illustrates a functional block diagram for an analysis system according to an exemplary embodiment of the invention.

FIG. 1 is a functional block diagram of a system for automated analysis of structured and unstructured data according to an exemplary embodiment of the invention. As shown in FIG. 1, the System integrates a variety of data sources and human interaction. In particular, a web interface 30 may receive a variety of documents from a variety of different data source locations 20. According to an embodiment, the data source locations 20 may include internal company websites and custom applications 21, external websites 22, emails 23, document repositories 24, and secure file transfer systems 25. According to an embodiment, a user 10 (e.g., a tax professional) may submit desired documents to the web interface 30 for data extraction. The variety of different documents may correspond to various file formats, e.g., zipped files, portable document format (PDF) files, etc. The submitted documents may be extracted with a file extractor 51, splitter/classifier 52, OCR & data capture 53, content extractor 61, page and section parser 62, ML/NLP and rules-based classifier 63, and canonical output generator 64. Further, the System may also include databases 40 to store artefacts generated during various stages of data extraction and to capture user feedback on extractions. According to an embodiment, if the documents submitted to the web interface 30 are zipped files, the file extractor 51 is configured to extract raw files from the zipped files. Further, if the submitted documents include multiple forms as opposed to only a single form document, the splitter component of the splitter/classifier 52 is configured to convert the multi-form document into multiple single-form documents. According to an embodiment, the document splitter uses AI-based algorithms trained on domain-specific knowledge (e.g. tax domain) to detect form boundaries and split the document along the detected boundaries. This allows the System to process multiple documents that may be part of a single file. Further, the classifier component of the splitter/classifier 52 is configured to classify all of the pages in the document using text and image-based algorithms. In particular, the OCR & data capture 53 leverages classification algorithms to classify page types. According to an embodiment, the classification algorithms may be implemented with deep learning techniques such as convolutional and sequence-based neural networks, such as long short-term memory neural networks, to classify, with high precision, images and text associated with the pages. For example, assuming the submitted documents are PDFs of a K-1 tax form, the OCR classification algorithms may isolate the pages in K-1 tax form into the following page types: (i) federal form, (ii) instruction page, (iii) federal footnotes, and (iv) state & local content. The OCR & data capture 53 is then configured to extract data from pages that have been identified as containing structured data, e.g., federal form. Then, after the variety of page types are extracted from the particular K-1 tax form, the extracted pages are transmitted to the content extractor 61. According to an embodiment, the content extractor 61 converts the contents in the extracted pages into text that is readable by the page and section parser 62. For example, the context extractor 61 may be a PDF-to-text converter. The page and section parser 62 is configured to parse unstructured content associated with the extracted pages. For example, the page and section parser 62 is configured to parse the "footnotes" pages of the submitted K-1 tax form. In particular, the page and section parser 62 is configured to split pages containing unstructured data into domain specific sections and identify relevant data to be extracted from these sections. According to an embodiment, the page and section parser 62 utilizes rules-based patterns, as well as machine learning, in order to identify section boundaries along which the pages may be split. In particular, the parser utilizes text in and around each line to identify the section boundaries. For example, certain text may indicate the end of a current section, while other text may indicate the start of a new section. Once the sections have been identified, the parser 62 isolates the relevant data that needs to be extracted from that section. Then, the combination of ML/NLP and rules-based classifier 63 is configured to map relevant data identified within each section by the parser 62 to a standardized output, e.g., label. As such, the ML/NLP and rules-based classifier 63 is trained and refined on an ongoing basis using the domain expertise of the subject matter (e.g., Tax) professionals without being explicitly programmed (e.g., supervised or unsupervised). This makes the solution robust, scalable, and maintainable. In particular, the subject matter expertise may be captured and stored by: (i) ingesting, mining, and classifying documents using natural language processing; (ii) incorporating advanced machine learning and artificial intelligence methods, and (iii) utilizing collaborative, iterative refinement with advisory and other stakeholders. Then, the canonical output generator 64 takes the standardized labels output by the classifier 63 and converts the standardized labels into a canonical data set, which is then stored in the databases 40. According to an embodiment, the canonical data set may be associated with JavaScript Object Notation ("JSON"). Other output formats can be supported by system as well, e.g., Microsoft Excel files, extensible markup language (XML), comma-separated values (CSV), etc. Downstream systems may then retrieve the canonical data sets from the databases 40 as desired. Further, according to an embodiment, the user 10 may utilize the web interface 30 to review and augment the results (i.e., standardized labels) from the ML/NLP and rules-based classifier 63. The System will also facilitate the review process by enabling efficient review of extracted information by focusing on areas of high importance. The reviewed results are used to further fine-tune the ML/NLP models.

Figure 2:
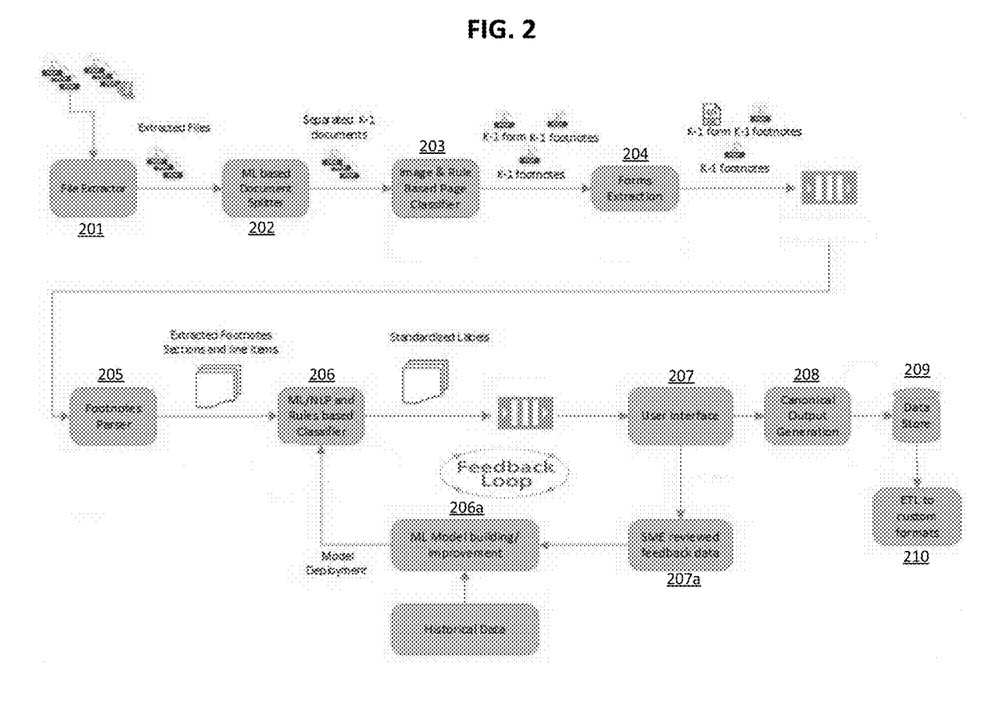
FIG. 2 illustrates a flow diagram according to an exemplary embodiment of the invention.

Referring to FIG. 2, as depicted in the figure, in a first step 201, a file extractor receives a plurality of documents for extraction. According to an embodiment, at least one of the documents may be a zipped file. Then, in step 202, an ML-based document splitter splits the extracted files into multiple single-form documents. Further, assuming the plurality of documents for extraction are associated with K-1 tax forms, the extracted files are split into separate K-1 documents. Then, in step 203, the separated documents are further separated based on a determined classification of each of the pages in the separated documents with an image and rule based page classifier. For example, as depicted in the figure, a certain K-1 document can be further separated into a page corresponding to the K-1 form cover and a few pages corresponding to the footnotes of the K-1 document. Then, in step 205, the footnotes of the K-1 document may be parsed with the footnotes parser in order to extract the footnote sections and line items in each of the footnote pages. In particular, the parser utilizes rules-based patterns, as well as machine learning, in order to identify section boundaries along which the pages may be split. Further, once the sections have been identified, the parser then isolates the relevant data, e.g., line items, that need to be extracted from that section. Then, in step 206, relevant data identified by the parser within each section are mapped to standardized outputs, e.g., labels by an ML/NLP and rules based classifier. Further, as depicted by steps 206*a*, 207, and 207*a*, the ML model utilized by the classifier may be modified and, therefore, improved utilizing historical data as well as user-reviewed (i.e., at the user interface) feedback data. Then, in step 208, the standardized labels output by the classifier may be converted into a canonical data set by a canonical output generator. Then, in step 209, the canonical data sets may be stored in a database for later use by downstream systems. In this regard, the canonical data sets may be extracted, transformed, and loaded (ETL) into custom formats as depicted in step 210.

Figure 3:
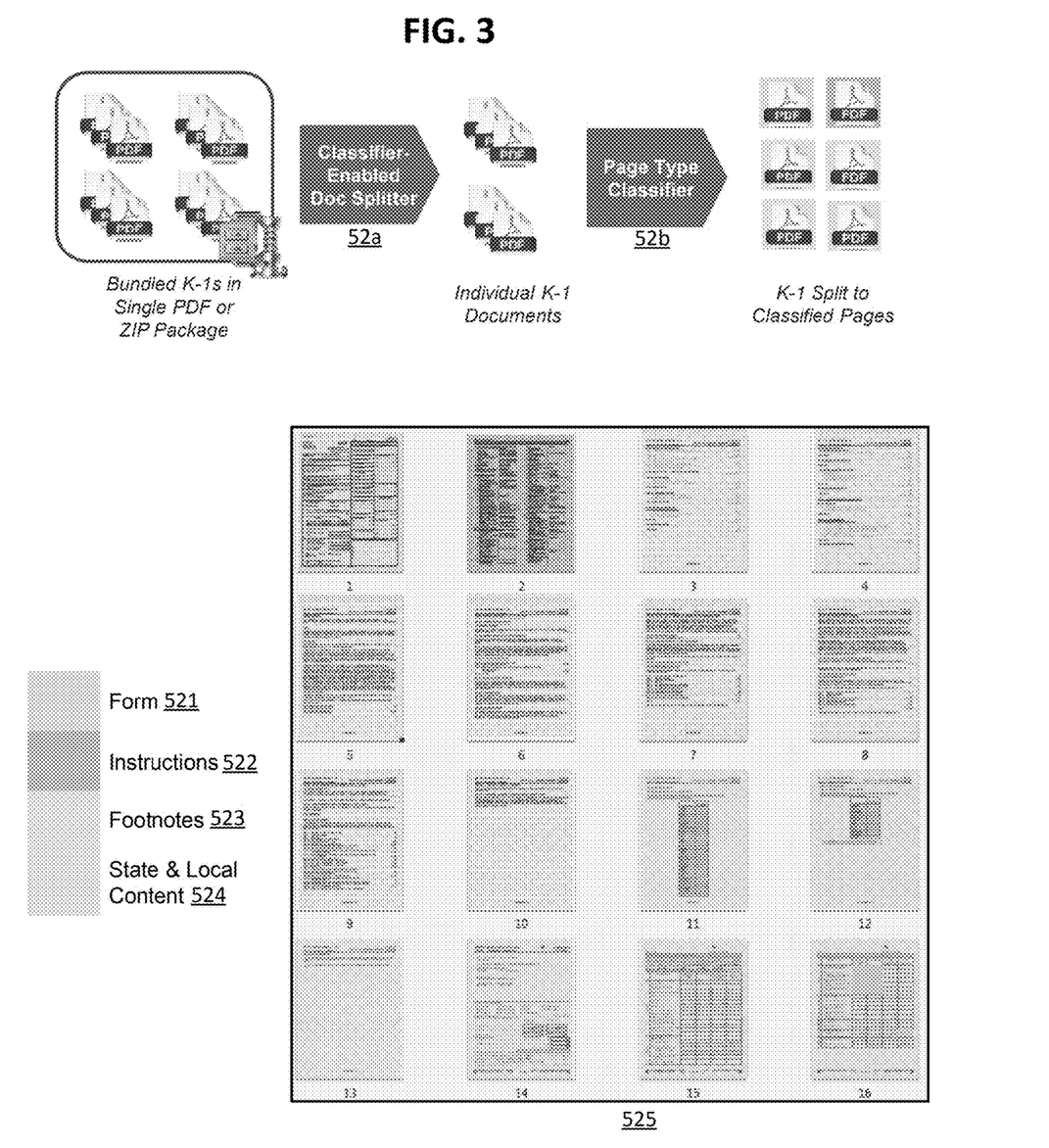
FIG. 3 illustrates a page classification process according to an exemplary embodiment of the invention.

Referring to FIG. 3, a page classification process may include a classifier-enabled document splitter 52*a* and a page type classifier 52*b*. As depicted in the figure, the classifier-enabled document splitter 52*a* is configured to (i) receive bundled documents, e.g., K-1 tax documents, in a single PDF or in a zipped packaged and (ii) split the bundled documents into individual K-1 documents. According to an embodiment, the classifier-enabled document splitter 52*a* may first extract the bundled K-1 documents from the ZIP package before splitting the bundled documents into individual K-1 documents. Then, the page type classifier 52*b* is configured to (i) received the individual K-1 documents and (ii) split the individual K-1 documents into their respective classified parts. For example, the individual K-1 documents may be split into the corresponding page types: federal form 521, instructions 522, footnotes 523, and state & local content 524. According to an embodiment, classified pages 525 depicts sixteen classified pages associated with an individual K-1 document. For example, page 1 of the classified pages 525 is associated with the federal form 521, page 2 of the classified pages 525 is associated with the instructions, pages 3 to 10 of the classified pages 525 are associated with the footnotes 523, and the pages 11 to 16 of the classified pages are associated with the state & local content 524.

Figure 4:
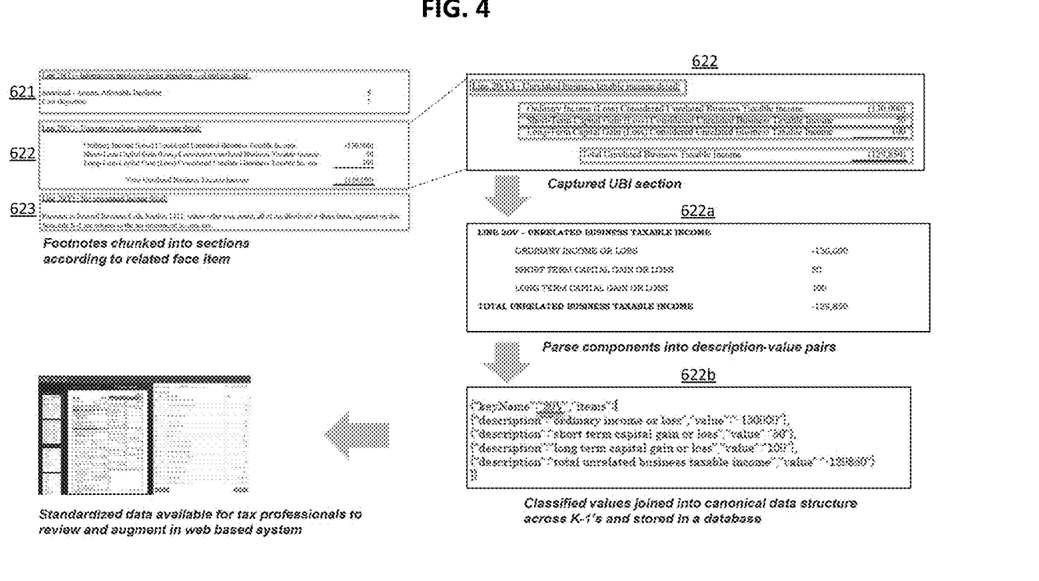
FIG. 4 illustrates an information extraction process according to an exemplary embodiment of the invention.

FIG. 4 illustrates an information extraction process according to an exemplary embodiment of the invention. In particular, the figure depicts how unstructured content such as the footnotes of a K-1 tax document may be parsed and processed. As described above, the page and sections parser 62 (or the footnotes parser as described in FIG. 2) identifies section boundaries in the footnotes pages based on related line items. For example, as depicted in the figure, section 621 is associated with "Line 20(T)," section 622 is associated with "Line(20V)", and section 623 is associated with "Line 20(Y)." The relevant data in section 622 is then isolated and extracted as depicted by 622*a*. The components of the data extracted in 622*a* may then be parsed into description-value pairs as depicted in 622*b*. The values classified in 622*b* may then be joined into canonical data structures across the variety of K-1 tax documents and stored in a corresponding database. As such, based on the above process, unstructured content in the footnotes of the K-1 tax document may be standardized and made available for other subject matter experts to review and augment with a web-based system, e.g., the web interface 30.

Figure 5:
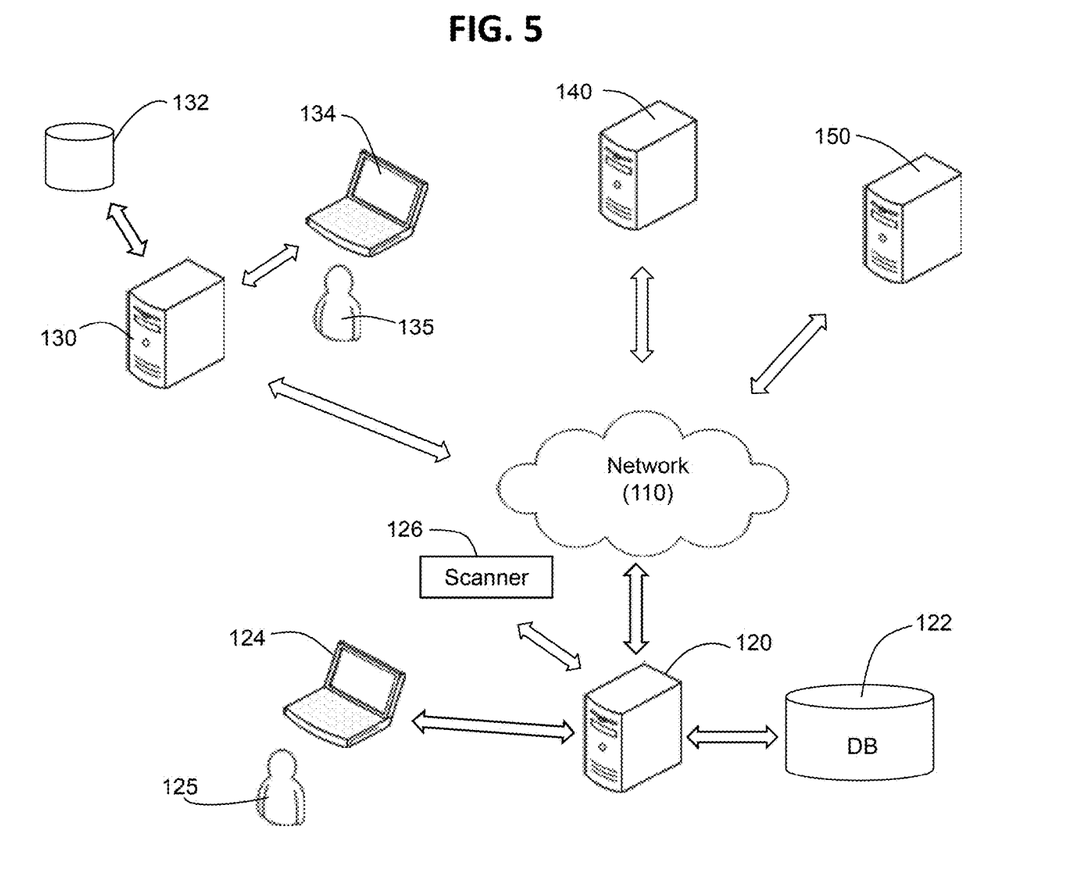
FIG. 5 illustrates a system diagram according to an exemplary embodiment of the invention.

FIG. 5 is a system diagram of the System according to an exemplary embodiment of the invention. As shown in FIG. 5, the System may comprise a server 120 and associated database 122 along with the software and data that are used to run the System. The System may also include a scanner 126 used to scan and ingest original documents into the System. The server 120 and database 122 may be used to store the ingested documents, and the other software and data used by the System. A user 125 such as a subject matter expert (e.g., tax professional) can access and use the server 120, scanner 126, and database 122 through a personal computing device 124, such as a laptop computer, desktop computer, or tablet computer, for example.

The System may also be configured to allow one or more clients or other users to access the System. For example, as shown in FIG. 5, a client 135 may use a personal computing device 134 and company server 130 to access the server 120 via network 110. The client may also transmit client-specific data (e.g., a set of tax forms to be analyzed) stored in a client database 132 to the System to be incorporated into the Dataset documents to be analyzed by the server 120 and stored in the database 122. The server 120 shown in FIG. 5 can receive other documents, spreadsheets, PDF files, text files, audio files, video files, and other structured and unstructured data from other clients or users, represented generally by servers 140 and 150.

Also shown in FIG. 5 is a network 110. The network 110 may comprise any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example. The other computing devices, such as servers, desktop computers, laptop computers, and mobile computers, may be operated by different individuals or groups, for example, and may transmit data such as contracts or insurance policies to the server 120 and database 122 via the network 110. In addition, cloud-based architectures, with containerized or micro-services based architectures may also be used to deploy the System.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements.

The foregoing descriptions provide examples of different configurations and features of embodiments of the invention. While certain nomenclature and types of applications/hardware are described, other names and application/hardware usage is possible and the nomenclature is provided by way of non-limiting examples only. Further, while particular embodiments are described, it should be appreciated that the features and functions of each embodiment may be combined in any combination as is within the capability of one skilled in the art. The figures provide additional exemplary details regarding the various embodiments.

Various exemplary methods are provided by way of example herein. The methods described can be executed or otherwise performed by one or a combination of various systems and modules.

The use of the term computer system in the present disclosure can relate to a single computer or multiple computers. In various embodiments, the multiple computers can be networked. The networking can be any type of network, including, but not limited to, wired and wireless networks, a local-area network, a wide-area network, and the Internet.

According to exemplary embodiments, the System software may be implemented as one or more computer program products, for example, one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "processor" encompasses all apparatus, devices, and machines for processing data, including by way of example a programmable processor, a computer, or multiple processors or computers. The apparatus can include, in addition to hardware, software code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

A computer may encompass all apparatus, devices, and machines for processing data, including by way of example a programmable processor, a computer, or multiple processors or computers. It can include, in addition to hardware, code that creates an execution environment for the computer program in question, e.g., code that constitutes processor firmware, a protocol stack, a database management system, an operating system, or a combination of one or more of them.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the embodiments have been particularly shown and described within the framework for conducting analysis, it will be appreciated that variations and modifications may be effected by a person skilled in the art without departing from the scope of the various embodiments. Furthermore, one skilled in the art will recognize that such processes and systems do not need to be restricted to the specific embodiments described herein. Other embodiments, combinations of the present embodiments, and uses and advantages of the will be apparent to those skilled in the art from consideration of the specification and practice of the embodiments disclosed herein. The specification and examples should be considered exemplary.

What is claimed is:

1. A computer-implemented method for analyzing at least one of structured and unstructured data, the method comprising:
    receiving at least one input file to be analyzed, wherein the at least one input file includes the structured and unstructured data;
    splitting the at least one input file into a plurality of documents based on rules-based patterns and artificial intelligence trained on domain-specific knowledge to detect boundaries and split the document along the detected boundaries;
    classifying, through rules-based patterns and machine learning, each page of the plurality of documents as one of structured or unstructured data, and the type of structured or unstructured data;
    parsing, via rules-based patterns and machine learning, the pages of the plurality of documents classified as unstructured data into domain specific sections;
    extracting relevant data from the parsed pages;
    mapping each of the extracted relevant data to standardized output;
    generating canonical data sets based on the standardized outputs; and
    training and refining the machine learning based on the mapping of relevant data to the standardized output.

2. The method of claim 1, further comprising:
    upon determining that the at least one input file is a ZIP file, extracting at least one raw file from the ZIP file.

3. The method of claim 1, further comprising:
    extracting other relevant data from the plurality of documents classified as structured data, wherein the other relevant data is extracted utilizing optical character recognition (OCR).

4. The method of claim 1, wherein the classifying is performed using a text and image-based classification.

5. The method of claim 1, wherein the parsing includes:
    identifying section boundaries in each of the pages; and
    isolating the relevant data associated with each of the section boundaries.

6. The method of claim 1, wherein the mapping is performed utilizing a machine learning model, wherein the machine learning model is configured to be modified based on (i) user-reviewed feedback data and (ii) historical data.

7. The method of claim 1, wherein the standardized outputs correspond to description-value pairs.

8. The method of claim 1, further comprising:
    storing the generated canonical data sets in at least one database.

9. The method of claim 8, further comprising:
    retrieving the canonical data sets from the at least one database; and augmenting the canonical data sets with a user interface.

10. The method of claim 1, wherein the at least one input file includes at least one portable document format (PDF) file.

11. The system of claim 1, wherein the standardized outputs correspond to description-value pairs.

12. The system of claim 1, further comprising:
a web interface, wherein the web interface is configured to:
retrieve the canonical data sets from the database; and
augment the retrieved canonical data sets.

13. A system for analyzing at least one of structured and unstructured data, the system comprising:
a scanner, wherein the scanner is configured to receive at least one input file to be analyzed, wherein the at least one input file includes the structured and unstructured data;
a server, wherein the server is configured to:
receive the scanned at least one input file;
split the at least one input file into a plurality of documents based on rules-based patterns and artificial intelligence trained on domain-specific knowledge to detect boundaries and split the document along the detected boundaries;
classify, through rules-based patterns and machine learning, each page of the plurality of documents as one of structured or unstructured data, and the type of structured or unstructured data;
parse, via rules-based patterns and machine learning, the pages of the plurality of documents classified as unstructured data into domain specific sections;
extract relevant data from the parsed pages;
map each of the extracted relevant data to standardized output;
generate canonical data sets based on the standardized outputs; and
train and refine the machine learning based on the mapping of relevant data to the standardized output; and
a database, wherein the database is configured to store generated canonical data sets.

14. The system of claim 13, wherein the at least one input file is a ZIP file, wherein at least one raw file is extracted from the ZIP file.

15. The system of claim 13, wherein the at least one input file includes at least one portable document format (PDF) file.

16. The system of claim 13, wherein the server is further configured to:
extract other relevant data from the plurality of documents classified as structured data, wherein the other relevant data is extracted utilizing optical character recognition (OCR).

17. The system of claim 13, wherein the classifying is performed using a text and image-based classification.

18. The system of claim 13, wherein the server is further configured to:
identify section boundaries in each of the pages during the parsing; and
isolate the relevant data associated with each of the section boundaries.

19. The system of claim 13, wherein the mapping is performed utilizing a machine learning model, wherein the machine learning model is configured to be modified based on (i) user-reviewed feedback data and (ii) historical data.

20. A system for analyzing at least one of structured and unstructured data, the system comprising:
a server, wherein the server is configured to:
receive at least one input file, wherein the at least one input file includes the structured and unstructured data;
split the at least one input file into a plurality of documents based on artificial intelligence trained on domain-specific knowledge to detect boundaries and split the document along the detected boundaries;
classify, through convolutional and sequence-based neural networks, each page of the plurality of documents as one of structured or unstructured data, and the type of structured or unstructured data;
parse, via rules-based patterns and machine learning, the pages of the plurality of documents classified as unstructured data into domain specific sections;
extract relevant data from the parsed pages;
map each of the extracted relevant data to standardized output;
generate canonical data sets based on the standardized outputs; and
continually train and refine the machine learning based on the mapping of relevant data to the standardized output.

* * * * *

UNITED STATES PATENT AND TRADEMARK OFFICE
CERTIFICATE OF CORRECTION

| | | |
|---|---|---|
| PATENT NO. | : 10,922,358 B2 | Page 1 of 1 |
| APPLICATION NO. | : 16/159105 | |
| DATED | : February 16, 2021 | |
| INVENTOR(S) | : Manish U. Garg et al. | |

It is certified that error appears in the above-identified patent and that said Letters Patent is hereby corrected as shown below:

On the Title Page

Item (72), Add the following inventor:
"Arthur James Franke, Ridgewood, NJ (US)"

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*